(12) United States Patent
Baarman et al.

(10) Patent No.: US 8,450,877 B2
(45) Date of Patent: May 28, 2013

(54) COMMUNICATION ACROSS AN INDUCTIVE LINK WITH A DYNAMIC LOAD

(75) Inventors: David W. Baarman, Fennville, MI (US); Joshua K. Schwannecke, Grand Rapids, MI (US); Scott A. Mollema, Rockford, MI (US); Matthew J. Norconk, Grand Rapids, MI (US)

(73) Assignee: Access Business Group International LLC, Ada, MI (US)

( * ) Notice: Subject to any disclaimer, the term of this patent is extended or adjusted under 35 U.S.C. 154(b) by 266 days.

(21) Appl. No.: 12/652,061

(22) Filed: Jan. 5, 2010

(65) Prior Publication Data
US 2010/0171369 A1    Jul. 8, 2010

Related U.S. Application Data

(60) Provisional application No. 61/142,842, filed on Jan. 6, 2009.

(51) Int. Cl.
*H02J 13/00* (2006.01)
*H04L 27/02* (2006.01)
*H04L 27/04* (2006.01)

(52) U.S. Cl.
USPC ........................................................ 307/104

(58) Field of Classification Search
USPC ........................................................ 307/104
See application file for complete search history.

(56) References Cited

U.S. PATENT DOCUMENTS

| | | | | |
|---|---|---|---|---|
| 5,105,190 A | * | 4/1992 | Kip et al. | 340/10.34 |
| 5,326,965 A | * | 7/1994 | Inoue | 235/492 |
| 5,345,231 A | * | 9/1994 | Koo et al. | 340/870.31 |
| 5,367,242 A | * | 11/1994 | Hulman | 320/108 |
| 5,541,604 A | * | 7/1996 | Meier | 342/42 |
| 5,721,535 A | * | 2/1998 | Ikefuji | 340/10.4 |
| 6,118,249 A | | 9/2000 | Brockmann | |
| 6,321,067 B1 | * | 11/2001 | Suga et al. | 455/41.2 |
| 6,469,472 B1 | | 10/2002 | Aoshima | |
| 6,547,149 B1 | * | 4/2003 | Wuidart et al. | 235/492 |
| 6,671,493 B2 | * | 12/2003 | Cernusca et al. | 455/41.2 |
| 7,003,048 B1 | * | 2/2006 | Eibel et al. | 375/295 |
| 7,366,466 B2 | * | 4/2008 | Forster et al. | 455/41.2 |

(Continued)

FOREIGN PATENT DOCUMENTS

| | | |
|---|---|---|
| EP | 0267009 | 5/1988 |
| EP | 0878891 | 11/1998 |

OTHER PUBLICATIONS

International Search Report and Written Opinion of the International Searching Authority for PCT/US2010/020062; mailed Mar. 12, 2010.

*Primary Examiner* — Adi Amrany
(74) *Attorney, Agent, or Firm* — Warner Norcross & Judd LLP (57) ABSTRACT

The present invention provides a load used for communication in a remote device having a dynamic communication load configuration. In one embodiment, the dynamic communication load configuration vanes as a function of a characteristic of power in the remote device. The remote device toggles between load configurations to communicate with the inductive power supply. A sensor in the remote device detects a characteristic of power in the remote device and configures the communication load based on the sensor output. In another embodiment, the remote device adjusts the dynamic communication load configuration in the remote device in response to a failure to receive a response from the inductive power supply.

28 Claims, 3 Drawing Sheets

U.S. PATENT DOCUMENTS

| | | | |
|---|---|---|---|
| 7,372,359 B2 * | 5/2008 | Wuidart et al. | 340/10.1 |
| 7,623,831 B2 * | 11/2009 | Forster et al. | 455/77 |
| 7,667,548 B2 * | 2/2010 | Meier | 331/166 |
| 7,697,892 B2 * | 4/2010 | Komoriya | 455/39 |
| 7,825,625 B2 * | 11/2010 | Posamentier | 320/108 |
| 7,919,886 B2 * | 4/2011 | Tanaka | 307/104 |
| 7,953,369 B2 * | 5/2011 | Baarman | 455/41.1 |
| 8,004,235 B2 * | 8/2011 | Baarman et al. | 320/108 |
| 8,060,011 B2 * | 11/2011 | Jin | 455/41.1 |
| 8,064,825 B2 * | 11/2011 | Onishi et al. | 455/41.1 |
| 8,090,550 B2 * | 1/2012 | Azancot et al. | 702/62 |
| 2005/0127868 A1 * | 6/2005 | Calhoon et al. | 320/108 |
| 2007/0164122 A1 * | 7/2007 | Ju | 235/492 |
| 2007/0246546 A1 * | 10/2007 | Yoshida | 235/492 |
| 2008/0200119 A1 * | 8/2008 | Onishi et al. | 455/41.1 |
| 2009/0001929 A1 | 1/2009 | Posamentier | |
| 2009/0011706 A1 * | 1/2009 | Wilson et al. | 455/41.1 |
| 2009/0021219 A1 * | 1/2009 | Yoda et al. | 320/137 |
| 2009/0101716 A1 * | 4/2009 | Mani et al. | 235/441 |
| 2009/0322158 A1 * | 12/2009 | Stevens et al. | 307/104 |
| 2010/0072825 A1 | 3/2010 | Azancot | |
| 2010/0151808 A1 | 6/2010 | Tonich et al. | |
| 2011/0050164 A1 * | 3/2011 | Partovi et al. | 320/108 |
| 2011/0163608 A1 * | 7/2011 | Brohlin et al. | 307/104 |

* cited by examiner

COMMUNICATION ACROSS AN INDUCTIVE LINK WITH A DYNAMIC LOAD

BACKGROUND OF THE INVENTION

The present invention relates to wireless communication, and more particularly to minimizing power losses during wireless communication.

Backscatter modulation is a common communication technique in many RFID applications. Backscatter modulation can be used in a passive RFID tag to send data back to an RFID reader without using a transmitter. Instead, communication is accomplished by repeatedly shunting a coil in the RFID tag through a transistor, the shunting causes slight fluctuations in the RFID reader's carrier amplitude. As the secondary winding is momentarily shunted, the primary winding experiences a momentary voltage drop. The RFID reader can detect this voltage drop and interpret that data as a bit. Bits can be strung together by systematically shunting the secondary winding. The data bits can be encoded by a variety of encoding algorithms that may affect error recovery, cost of implementation, bandwidth, or synchronization capability.

Backscatter modulation and variations thereof have also been used outside the RFID context, for example in communication between an inductive power supply and a remote device in a wireless power transfer system. U.S. patent application Ser. No. 11/855,710 filed by David W. Baarman on Sep. 14, 2008, entitled "System and Method for Inductively Charging a Battery" and U.S. Patent Application No. 61/019,411 filed by David W. Baarman on Jan. 7, 2008 entitled "Inductive Power Supply with Duty Cycle Control" disclose shunting a resistor in a remote device to communicate with an inductive power supply, and are both herein incorporated by reference.

There are a number of challenges with backscatter modulation and similar techniques that occur within inductive power supply systems that are not as problematic in traditional RFID systems. In an inductive power supply system, the amount of power delivered to the remote device may vary. For example, a mobile phone in standby mode will likely draw significantly less power from an inductive power supply than the mobile phone would draw during a telephone call. As the amount of power drawn by or delivered to the secondary increases, the power losses associated with communicating increase. Further, power losses are often amplified because the communication resistor for a remote device is typically selected during manufacture to account for worse case scenarios. This additional reliability often comes at the price of additional power losses during communication, even in normal or optimal conditions. The nature of a wirelessly powered load can become dynamic with the variances of coupling associated with spatial movement which is complicated by a wide array of device requirements from light to heavy loads. This dynamic can change the power requirements of the system, adjustments to the system as described herein can help account for the changing power requirements.

SUMMARY OF THE INVENTION

The aforementioned problems are overcome by the present invention wherein a load used for communication in a remote device varies with the amount of power delivered to the remote device.

An inductive power supply system in accordance with the present invention includes an inductive power supply and a remote device with multiple load configurations, at least one being a dynamic load configuration. The remote device toggles between the load configurations to communicate with the inductive power supply. A sensor in the remote device detects the amount of power that the inductive power supply delivers or that the remote device draws. A controller in the remote device is capable of configuring the dynamic load configuration based on the detected power. The controller in the remote device is capable of toggling between the different load configurations to communicate with the inductive power supply.

The dynamic load configuration can be configured to create a sufficient difference in reflected impedance or load shift from the other load configuration so that the inductive power supply can receive communication. The load shift can account for the amount of power delivered to the remote device and ensure that that the load shift is sufficient for that amount of power. The dynamic load configuration can also be configured to minimize the amount of power lost due to communication with the inductive power supply. A larger load shift consumes more power, therefore minimizing the size of the load shift also minimizes power losses. It should be noted that the secondary circuit may be tuned to resonance by the primary and may also include a series and/or parallel resonant capacitor(s).

In one embodiment, the dynamic load configuration is configured by toggling between the dynamic load configuration and another load configuration while gradually increasing the resistance of the dynamic load configuration until the inductive power supply receives the communication. The dynamic load configuration where the inductive power supply first receives communication is the load configuration with the smallest load shift sufficient for communication, which also equates to the dynamic load configuration capable of communication with the least power losses.

By dynamically changing at least one of the load configurations based on the amount of power delivered to the remote device, significant power savings can be realized.

These and other objects, advantages, and features of the invention will be more fully understood and appreciated by reference to the description of the current embodiment and the drawings.

DESCRIPTION OF THE CURRENT EMBODIMENT

Figure 1:
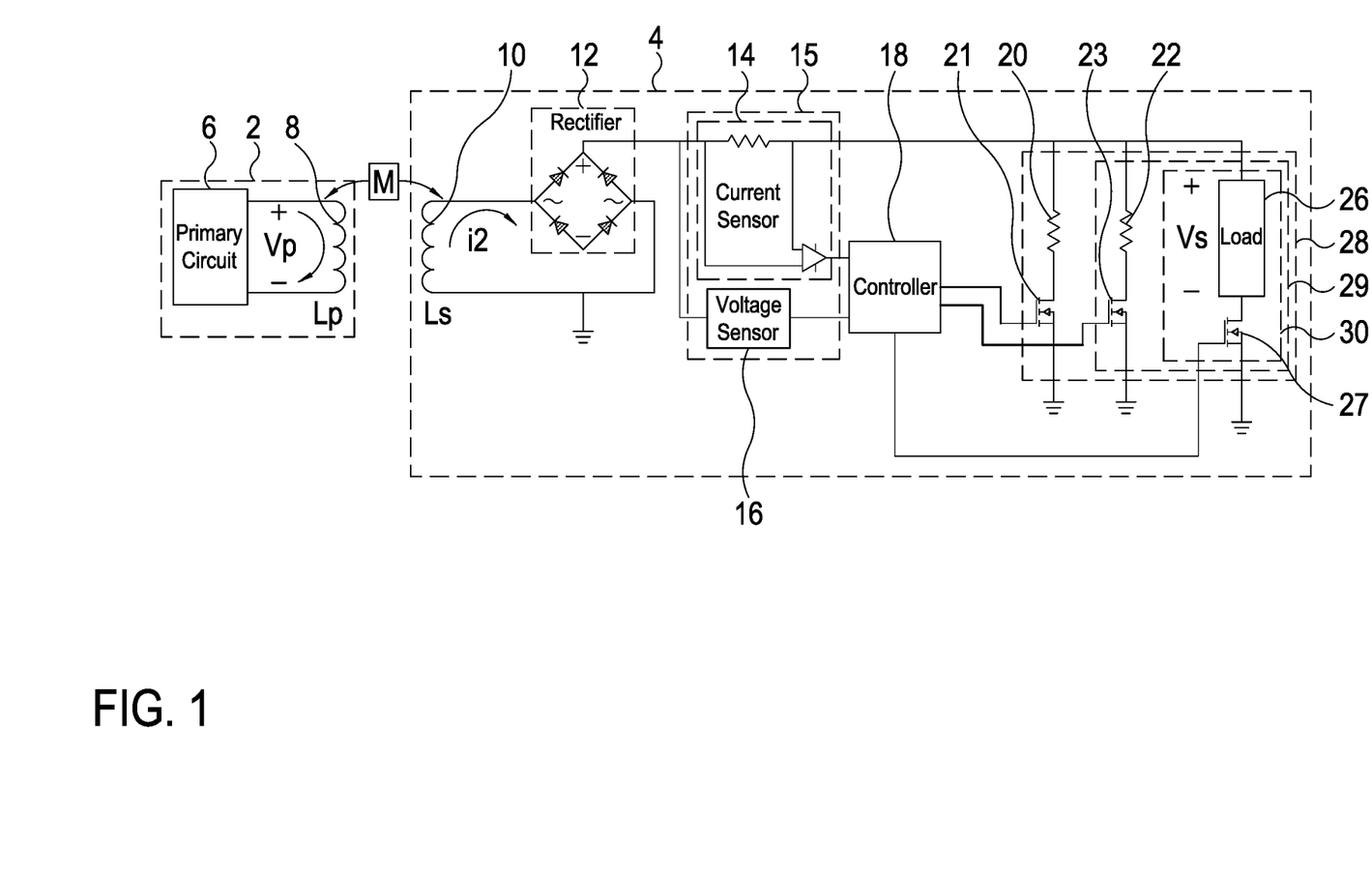
FIG. 1 illustrates a representative remote device circuit diagram in accordance with one embodiment of the present invention.

An inductive power supply system in accordance with one embodiment of the present invention is shown in FIG. 1 and generally designated 1. The inductive power supply system includes an inductive power supply 2 and a remote device 4. The remote device 4 has multiple communication load configurations, at least one being a dynamic communication load configuration. The remote device 4 toggles between the communication load configurations to communicate with the inductive power supply 2. A sensor in the remote device 4 detects the amount of power that the inductive power supply 2 delivers to the remote device 4. A controller 18 in the remote device is capable of configuring the dynamic communication load configuration based on the detected power. The controller in the remote device is also capable of toggling between the different communication load configurations to communicate with the inductive power supply 2.

The present invention is suitable for use with most inductive power supplies. Accordingly, the inductive power supply 2 will not be described in detail. One embodiment of the inductive power supply 2 illustrated in FIG. 1 includes a primary circuit 6 with rectification and power conditioning circuitry (not shown), a controller (not shown), a circuit sensor (not shown), and an inverter (not shown). The primary circuit 6 generates and applies alternating current to the primary 8. As a result of the alternating current applied by the primary circuit 6, the primary 8 generates an electromagnetic field. The remote device receives power from the inductive power supply and sends back a communication, as described in more detail below. The primary circuit 6 may be essentially any circuitry capable of supplying alternating current to the primary 8 generating a sensor output indicative of a characteristic of power being affected by a characteristic of the remote device reflected through said inductive coupling and controlling operation of said inductive power supply in response to said sensor output.

It may be desirable to use an inductive power supply including the resonant seeking circuit of the inductive power supply system disclosed in U.S. Pat. No. 6,825,620, which is entitled "Inductively Coupled Ballast Circuit" and issued Nov. 30, 2004, to Kuennen et al; the adaptive inductive power supply of U.S. Pat. No. 7,212,414, which is entitled "Adaptive Inductive Power Supply" and issued May 1, 2007, to Baarman; the inductive power supply with communication of U.S. Ser. No. 10/689,148, which is entitled "Adaptive Inductive Power Supply with Communication" and filed on Oct. 20, 2003 to Baarman; the inductive power supply for wirelessly charging a LI-ION battery of U.S. Ser. No. 11/855,710, which is entitled "System and Method for Charging a Battery" and filed on Sep. 14, 2007 by Baarman; the inductive power supply with device identification of U.S. Ser. No. 11/965,085, which is entitled "Inductive Power Supply with Device Identification" and filed on Dec. 27, 2007 by Bauman et al; or the inductive power supply with duty cycle control of U.S. Ser. No. 61/019,411, which is entitled "Inductive Power Supply with Duty Cycle Control" and filed on Jan. 7, 2008 by Baarman—all of which are incorporated herein by reference in their entirety.

The illustrated embodiment is described in connection with a generic remote device 4. It should be understood that the present invention is suitable for use with most remote devices, such as cellular telephones, portable music devices, laptops, or other electrically powered devices. The remote device 4 of the illustrated embodiment includes a secondary 10, a rectifier 12, a detector system 15, a controller 18, one or more communication loads 20, 22 connected with switches 21, 23, and a target load 26 connected with a switch 27.

In the illustrated embodiment, the primary is an inductive coil with 2.8 micro Henry and the secondary is an inductive coil having 4.5 micro Henry. In alternative embodiments, the secondary or primary coils may have different values.

The present invention is suitable for use with a variety of different rectifiers. For example, a full bridge, synchronous, or half bridge rectifier may be used in the remote device 4. In the illustrated embodiment, a full bridge rectifier 12 converts the AC power received by the secondary 10 into DC power. In alternative embodiments, the rectifier 12 may be removed and the remote device may use AC power.

The detector system 15 detects a characteristic of power in the remote device. For example, the characteristic of power could include voltage, current, phase, an amount of power delivered by the inductive power supply, an amount of power drawn by the remote device. Although the detector system 15 in the illustrated embodiment includes both a current sensor 14 and a voltage sensor 16, alternative embodiments may include only one of them of them. Further, in some embodiments, a different type of sensor or sensor system may replace one or both of the current sensor 14 and voltage sensor 16. In the illustrated embodiment the current sensor 14 and voltage sensor 16 respectively provide current and voltage measurements of the amount of power delivered to the remote device 4 to the controller 18. In alternative embodiments, the detector system 15 may detect an absolute shift in impedance, shift in current at driving frequency, or some other characteristic. In an embodiment with a resonant primary circuit (series or parallel capacitor), the detector system may account for phase in addition to magnitude.

The present invention is suitable for use with a wide variety of different controllers. The illustrated embodiment includes a digital microcontroller capable of configuring the dynamic communication load configuration and toggling between the different communication load configurations to communicate with the inductive power supply 2. In alternative embodiments, the controller may be an analog controller, an FPGA, or some other controller or controllers capable of configuring the dynamic communication load configuration and toggling between the different communication load configurations. The controller may be programmed to perform additional functions related or unrelated to communication.

The present invention is suitable for use with a variety of communication loads. The illustrated embodiment includes two communication loads 20, 22 with the same value, but alternative embodiments could include a different number of communication loads or communication loads with different values. In the current embodiment, each communication load 20, 22 is a 20 Ohm resistor. In alternative embodiments, different size resistors may be used. Each of the communication loads 20, 22 are connected in parallel with the target load 26 via switches 21, 23. The communication loads 20, 22 can be resistors, diodes, capacitors, inductors, or any other circuit element capable of being shunted to communicate with the inductive power supply. In alternative embodiments, the communication loads 20, 22 may be connected in series instead of parallel. The switches 21, 23 in the current embodiment are field effect transistors that are controlled by controller 18, but in alternative embodiments, other switching elements may replace the transistors. In some embodiments, the target load 26 may be used as a communication load, which will be discussed in more detail below.

In one embodiment, the communication load is an RC circuit or other dynamic load. The capacitor allows a large impulse current on each pulse, and then discharges on the off cycle by the resistor. In this way, a large edge can be generated, but the overall power loss remains small.

In another embodiment, the communication load is a diode or other device with a constant voltage drop. The diode is inserted in series with the load and periodically shorted out to inject a load modulation of constant proportion. The power lost in a diode is the amount of current times the amount of voltage. Therefore, power loss increases linearly as the current goes up, as opposed to the square of the current as in the resistive cases.

A variety of different target loads may be included in the remote device 4. The target load 26 is represented as a generic load in the illustrated embodiment, but it should be understood that the target load could be a battery, capacitor, a different power storage circuit, or some other circuitry capable of utilizing the wireless power provided to the remote device 4 by the inductive power supply 2.

In order for the remote device 4 to communicate with the inductive power supply 2, the remote device 4 toggles between at least two different communication load configurations, at least one of which is a dynamic communication load configurations.

In the illustrated embodiment, one load configuration is configured by disconnecting the target load 26 and disconnecting the communication loads 20, 22. The dynamic communication load configuration is configured by connecting 1) the target load 26 when a large amount of power is delivered to the remote device (dynamic load configuration 30); 2) the target load and a communication load when a medium amount of power is delivered to the remote device (dynamic load configuration 29); and 3) the target load and two communication loads when a small amount of power is delivered to the remote device (dynamic load configuration 28). Thresholds may be selected for determining what constitutes a small, medium, and large amount of power. In one embodiment, the remote device 4 may store the thresholds specific to that device.

For example, in one embodiment, the dynamic communication load configuration is configured by connecting the target load 26 and depending on the amount of power detected some combination of communication loads 20, 22. Referring to FIG. 1, assuming a constant voltage of 20 V for all cases: 1) if the current sensor detects less than 44 mA then both communication loads 20, 22 are connected (dynamic load configuration 28); 2) if the current sensor detects between 44 mA and 1 A then one communication resistor is connected (dynamic load configuration 29); and 3) if the current sensor detects more than 1 A then neither communication resistor is connected (dynamic load configuration 30). Alternative embodiments may use different thresholds to determine which communication loads are connected. Further, a different number of thresholds and communication loads may be used in alternative embodiments.

In one embodiment, the dynamic communication load configuration is configured using a different load or combination of loads based on measured power level at that time so that the dynamic communication load configuration is always a certain percentage greater than the delivered load. For example, in one embodiment, at least a 2% difference between the reflected impedance of the load configurations is necessary in order for communication to be distinguished from noise.

In one embodiment the dynamic communication load configuration is configured by gradually increasing the communication load until a message is received by the inductive power supply. This method has the benefit of being able to easily account for changes in mutual inductance that may arise due to primary secondary alignment or parasitic metal.

In an alternative embodiment, where the target load 26 is a battery, the target load 26 may not be included in the dynamic communication load configuration at all in order to isolate and protect the load. Instead, the target load 26 is disconnected during communication and a number of communication loads 20, 22 are connected depending on the amount of power delivered to the remote device 4.

In the current embodiment, the other communication load configuration is a static communication load configuration configured by disconnecting the target load 26 and all of the communication loads 20, 22. This configuration produces a primary impedance of 3.519 Ohms. Alternative static communication load configurations may be configured by connecting the target load, one or more communication loads, or a combination thereof. The other communication load configuration may also be a dynamic communication load configuration.

Figure 2:
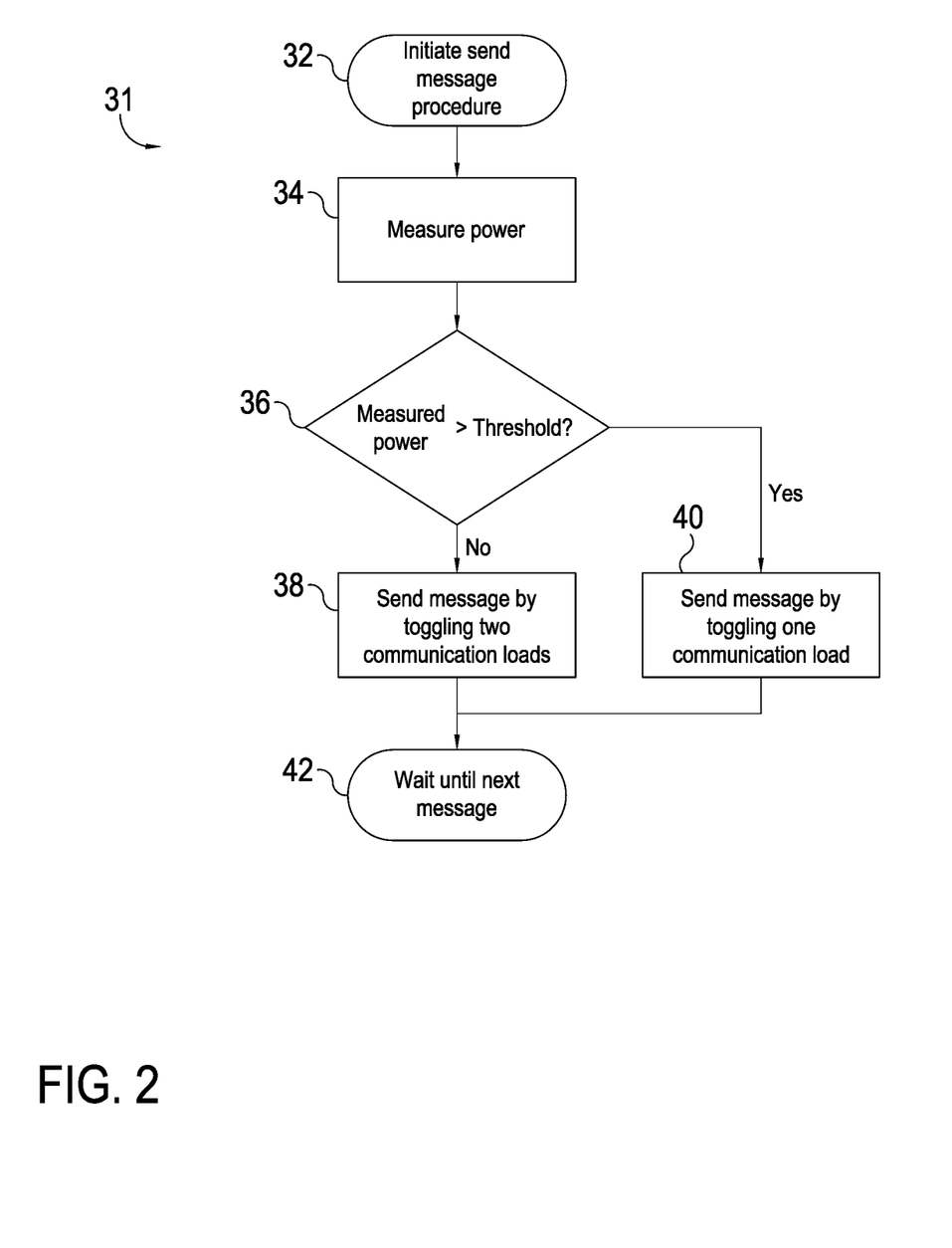
FIG. 2 illustrates a flowchart in accordance with one embodiment of the present invention.

FIG. 2 illustrates a flowchart for one embodiment of a method for communication using a dynamic load configuration 31. The inductive power supply initiates a send message procedure 32. The remote device receives power from the inductive power supply and measures the power delivered to the remote device 34. The controller on the remote device determines if the measured power is greater than a threshold 36. If the measured power is larger than the threshold then the dynamic load configuration is configured to include only the load and a message is sent by toggling the target load 40. If the measured power is less than the threshold then the dynamic load configuration is set to toggle the communication resistor and the target load simultaneously 38. The message is sent by toggling between the dynamic load configuration and the other load configuration, in this case a completely disconnected load. Once the message is sent, the remote device waits until there is another message to be sent 42.

Figure 3:
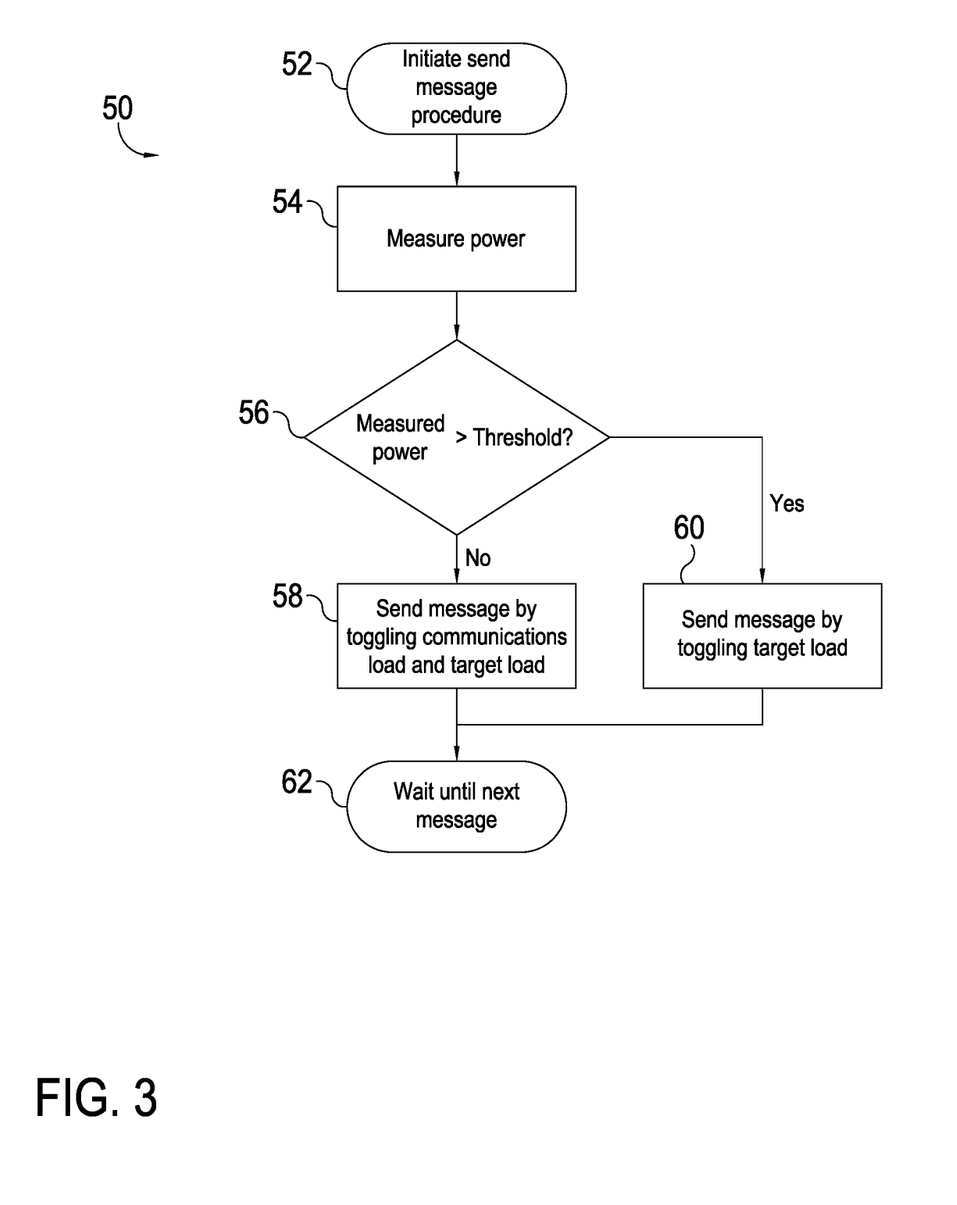
FIG. 3 illustrates, a flowchart in accordance with another embodiment of the present invention.

FIG. 3 illustrates a flowchart for another embodiment of a method for communication using a dynamic load configuration 50. The inductive power supply initiates a send message procedure 52. The remote device receives power from the inductive power supply and measures the power delivered to the remote device 54. The controller on the remote device determines if the power is above a threshold 56. If the power is above the threshold then the dynamic load configuration is configured to include one communication resistor and the target load is disconnected 60. If the power is below the threshold then the dynamic load configuration is configured by connecting two communication resistors in parallel and disconnecting the target load 58. Once the message is sent, the remote device waits until there is another message to be sent 52.

The above description is that of the current embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The embodiments of the invention in which an exclusive property or privilege is claimed are defined as follows:

1. A contactless power supply system comprising:
   an inductive power supply and a remote device, said remote device capable of inductively receiving power from said power supply via an inductive coupling;
   wherein said inductive power supply includes:
      a primary for inductively transferring power to said remote device;
      a primary circuit operatively coupled to said primary, said primary circuit 1) generating an output indicative of a characteristic of power being affected by a characteristic of said remote device reflected through said inductive coupling and 2) controlling operation of said inductive power supply in response to said output; and
   wherein said remote device includes:
      a target load capable of utilizing said power provided by said inductive power supply;
      a sensor for detecting a characteristic of power in said remote device;

a communication load capable of being configured in at least three different communication load states each having a different value, and wherein:
   a first communication load state of said at least three different communication load states has a first value, said first communication load state enabling current to pass through said target load and said communication load;
   a second communication load state of said at least three different communication load states has a second value, said second communication load state enabling current to pass through said target load and said communication load, said first value and said second value being different;
   a third communication load state of said at least three different communication load states is an off state in which current passes through said target load and effectively bypasses said communication load; and
said communication load capable of being toggled between said first and said second communication load states to communicate with said inductive power supply; and
a controller programmed to 1) configure said communication load in one or more of said at least three different communication load states based on output from said sensor; and 2) based on a binary data stream, toggle said communication load between said first communication load state to create a high signal and said second communication load state to create a low signal to communicate with said inductive power supply.

2. The contactless power supply system of claim 1 wherein said at least three different communication load states include at least one of said communication load including a resistor, said communication load including a diode, said communication load including a capacitor, said communication load including an inductor, said communication load including a dynamic load, and said communication load including a device with a constant voltage drop.

3. The contactless power supply system of claim 1 wherein said controller is programmed to configure said communication load to include a first resistance when said output from said sensor is below a threshold and wherein said controller is programmed to configure said communication load to include a second resistance when said output from said sensor is above said threshold. Zone Name: OCRZone 4. The contactless power supply system of claim 1 wherein said controller is programmed to configure said communication load in one of said at least three communication load states when said output from said sensor is below a threshold and wherein said controller is programmed to configure said communication load in a different communication load state when said output from said sensor is above said threshold.

5. The contactless power supply system of claim 1 wherein said controller is programmed to switch between different communication load states by increasing a resistance of said communication load until a message is received by said inductive power supply.

6. The contactless power supply system of claim 1 wherein said communication load includes first and second communication resistors, and wherein one of said at least three communication load states includes said first communication resistor and another of said at least three communication load states includes said first and second communication resistors.

7. The contactless power supply system of claim 1 wherein said at least three communication states includes said off state and at least two working states, wherein said communication load is toggled between said off state and one of said at least two working states to communicate with said inductive power supply.

8. A remote device for receiving power from an inductive power supply, said remote device comprising:
   a target load capable of utilizing said power provided by said inductive power supply;
   a sensor for detecting a characteristic of power in said remote device;
   a communication load capable of being configured in at least three different communication load states each having a different value, and wherein:
   a first communication load state of said at least three different communication load states has a first value, said first communication load state enabling current to pass through said target load and said communication load;
   a second communication load state of said at least three different communication load states has a second value, said second communication load state enabling current to pass through said target load and said communication load, said first value and said second value being different;
   a third communication load state of said at least three different communication load states is an off state in which current passes through said target load and effectively bypasses said communication load; and
   said communication load is capable of being toggled between said first and said second communication load states to communicate with said inductive power supply; and
   a controller programmed to 1) configure said communication load in one or more of said at least three different communication load states based on output from said sensor; and
   2) based on a binary data stream, toggle said communication load between said first communication load state to create a high signal and said second communication load state to create a low signal to communicate with said inductive power supply.

9. The remote device of claim 8 wherein said at least three different communication load states include at least one of said communication load including a resistor, said communication load including a diode, said communication load including a capacitor, said communication load including an inductor, said communication load including a dynamic load, and said communication load including a device with a constant voltage drop.

10. The remote device of claim 8 wherein said controller is programmed to configure said communication load to include a first resistance when said output from said sensor is below a threshold and wherein said controller is programmed to configure said communication load to include a second resistance when said output from said sensor is above said threshold.

11. The remote device of claim 8 wherein said controller is programmed to configure said communication load in one of said at least three communication load states when said output from said sensor is below a threshold and wherein said controller is programmed to configure said communication load in a different communication load state when said output from said sensor is above said threshold.

12. The remote device of claim 8 wherein said controller is programmed to switch between different communication load states by increasing a resistance of said communication load until a message is received by said inductive power supply.

13. A method for communicating from a remote device and an inductive power supply comprising:

providing a communication load configurable in at least three communication load states, the at least three communication load states including a first communication load state, a second communication load state, and a third communication load state, the third communication load state being an off state;

receiving power from the inductive power supply;

measuring a characteristic of power received by the remote device;

determining a first configuration of the communication load for the first communication load state based on the characteristic of power measured, the first configuration of the communication load being different from a second configuration of the communication load for the second communication load state;

communicating with the inductive power supply by, based on a binary data stream, toggling between the first communication load state to create a high signal and the second communication load state to create a low signal.

14. The method of claim 13 wherein determining a first configuration of the communication load for the first communication load state includes determining the first a working communication load state based on an amount of power measured and comparing the amount of power measured to a threshold.

15. The method of claim 13 wherein determining a first configuration of the communication load for the first communication load state based on the characteristic of power measured includes determining the first communication load state to be a specific percentage greater than a delivered amount of power in another communication load state such that toggling between the first and second communication load states allows the reflected impedance to be distinguished as communication instead of noise.

16. The method of claim 13 wherein determining a first configuration of the communication load for the first communication load state based on the characteristic of power measured includes increasing a resistance in the first communication load state until a message is received by the inductive power supply.

17. The method of claim 13 wherein determining a first configuration of the communication load for the first a working communication load state based on the characteristic of power measured includes determining the first a working communication load state that reduces an amount of power lost due to communication with the inductive power supply using a static load configuration.

18. The method of claim 13 wherein determining a first configuration of the communication load for the first communication load state based on the characteristic of power measured includes determining first communication load state that creates a sufficient difference in reflected impedance so that the inductive power supply can receive communication from the remote device.

19. The method of claim 18 wherein the another of the at least three communication load states is the off state.

20. The method of claim 13 wherein the another of the at least three communication load states is the off state, and wherein communicating with the inductive power supply includes toggling between the working communication load state and the off state.

21. A method for communicating from a remote device to an inductive power supply comprising:

providing a communication load configurable in at least three communication load states, one of the at least three communication load states being an off state;

receiving power from the inductive power supply;

determining first working communication load state and a second working communication load state in the remote device, the first and second working communication load states state being selected from the at least three communication load states other than the off state, the first and second working communication load states having different communication load configurations;

transmitting a communication to the inductive power supply by, based on a binary data stream, toggling the communication load between the first determined working communication load state to create a high signal and the second determined working communication load state to create a low signal;

waiting for a response from the inductive power supply;

adjusting the first determined working communication load state in the remote device in response to a failure to receive the response, the adjusted first working communication load state being selected from the at least three communication load states;

re-transmitting the communication to the inductive power supply by toggling the communication load between the adjusted first working communication load state and another of the at least three communication load states.

22. A remote device for receiving power from an inductive power supply via an inductive coupling, said remote device comprising:

a secondary capable of receiving power from the inductive power supply via the inductive coupling;

a target load capable of utilizing said power received by said secondary;

a communication load capable of being configured in at least three communication load states, said at least three communication load states including an off state and at least two working communication states, said at least two working communication states including a first working communication state and a second working communication state, said communication load in said first working communication state being configured differently from said communication load in said second working communication state;

a controller coupled to said communication load, said controller programmed to communicate with the inductive power supply via the inductive coupling by, based on a binary data stream, toggling said communication load between said first working communication state to create a high signal and said second communication state to create a low signal.

23. The remote device as claimed in claim 22 wherein said controller is further programmed to communicate with the inductive power supply by toggling between one of said at least two working states and said off state.

24. The remote device as claimed in claim 22 wherein:

said communication load includes first and second communication elements;

said remote device further includes a first switch coupled to said first communication element and a second switch coupled to said second communication element;

said first switch is capable of selectively configuring said communication load in said first working communication state of said working communication states by shunting power received in said secondary through said first communication element; and said second switch is capable of selectively configuring said communication load in said second working state of said working communication states by shunting power received in said secondary through said second communication element.

25. The remote device as claimed in claim 24 wherein:
said controller is coupled to said first and second switches;
said controller is programmed to communicate with the inductive power supply by selectively activating said first switch and said second switch to toggle between said first working communication state and said off second working communication state.

26. The remote device as claimed in claim 25 wherein said remote device further comprises a sensor for detecting a characteristic of power in said secondary, and wherein said controller determines a value of said communication load in said at least two working communication states based on said sensed characteristic of power.

27. The remote device as claimed in claim 24 wherein said controller is programmed to configure said communication load in said off state by opening said first and second switches to prevent said first and second communication elements from shunting power.

28. The remote device as claimed in claim 24 wherein said first communication element is a first resistor and said second communication element is a second resistor.

* * * * *

UNITED STATES PATENT AND TRADEMARK OFFICE
CERTIFICATE OF CORRECTION

PATENT NO.         : 8,450,877 B2
APPLICATION NO.    : 12/652061
DATED              : May 28, 2013
INVENTOR(S)        : David W. Baarman et al.

It is certified that error appears in the above-identified patent and that said Letters Patent is hereby corrected as shown below:

Title Page, Column 2, line 4 in Abstract, delete "vanes" and replace with --varies--

In the Claims

Column 7 line 46, delete "Zone Name: OCRZone"

Column 9 line 22, delete "a working"

Column 9 lines 42-43, delete "a working"

Column 9 line 44, delete "a working"

Column 10 line 4, delete "state"

Column 11 line 6, delete "off"

Signed and Sealed this
Twenty-fourth Day of March, 2015

Michelle K. Lee
*Director of the United States Patent and Trademark Office*